(12) United States Patent
Payen et al.

(10) Patent No.: US 7,575,193 B2
(45) Date of Patent: Aug. 18, 2009

(54) ANTI-CRASH METHOD AND SYSTEM, AN UNDERCARRIAGE, AND AN AIRCRAFT

(75) Inventors: Herve Payen, Velaux (FR); Vincent Malfuson, Gigaac (FR)

(73) Assignee: Eurocopter, Marignane (FR)

( * ) Notice: Subject to any disclaimer, the term of this patent is extended or adjusted under 35 U.S.C. 154(b) by 408 days.

(21) Appl. No.: 11/429,255

(22) Filed: May 8, 2006

(65) Prior Publication Data
US 2007/0057117 A1    Mar. 15, 2007

(30) Foreign Application Priority Data
May 12, 2005   (FR)   ................... 05 04746

(51) Int. Cl.
*B64C 25/00* (2006.01)
*B64C 25/52* (2006.01)
*B64C 25/60* (2006.01)
(52) U.S. Cl. .............................. 244/100 R; 244/102 R; 244/102 A; 244/139
(58) Field of Classification Search ............. 244/100 R, 244/100 A, 139, 102 R, 102 A, 102 SL, 102 SS, 244/104 R, 104 CS
See application file for complete search history.

(56) References Cited

U.S. PATENT DOCUMENTS

| | | | | |
|---|---|---|---|---|
| 2,437,135 A | * | 3/1948 | Blair et al. ............... | 244/102 R |
| 4,155,522 A | * | 5/1979 | Sealey ..................... | 244/102 R |
| 4,392,622 A | * | 7/1983 | McClaflin ............... | 244/102 A |
| 4,392,623 A | * | 7/1983 | Munsen et al. .......... | 244/102 R |
| 4,537,374 A | * | 8/1985 | Barnoin et al. .......... | 244/102 R |
| 5,337,976 A | * | 8/1994 | Derrien .................. | 244/102 A |
| 6,318,669 B1 | * | 11/2001 | Dazet et al. ............. | 244/100 R |

FOREIGN PATENT DOCUMENTS

| | | | |
|---|---|---|---|
| FR | 2 687 123 A | | 8/1993 |
| FR | 2 689 087 A | | 10/1993 |

* cited by examiner

*Primary Examiner*—Michael R Mansen
*Assistant Examiner*—Philip J Bonzell
(74) *Attorney, Agent, or Firm*—Young & Thompson

(57) ABSTRACT

An undercarriage (2) for an aircraft (1) includes anti-crash elements that are specific to a second stage of a crash after the end of a first stage. The undercarriage includes: a device for blocking a retraction actuator (6); a device for retaining the actuator (6) functionally separated from a landing gear leg (9); and a device for applying controlled braking to the pivoting of the leg (9) by irreversible lengthening of a deformable member (25).

13 Claims, 6 Drawing Sheets

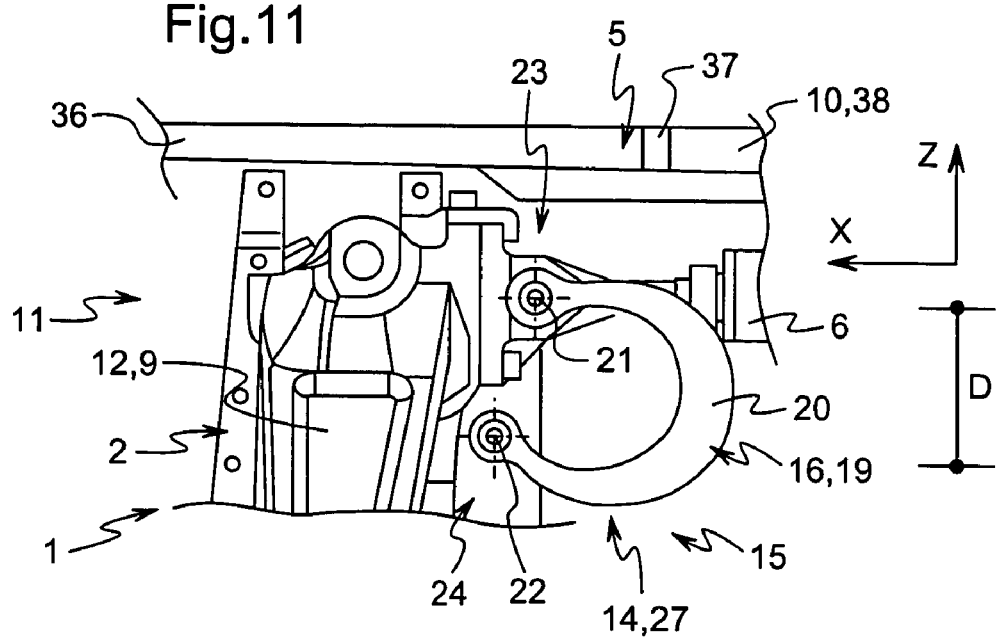
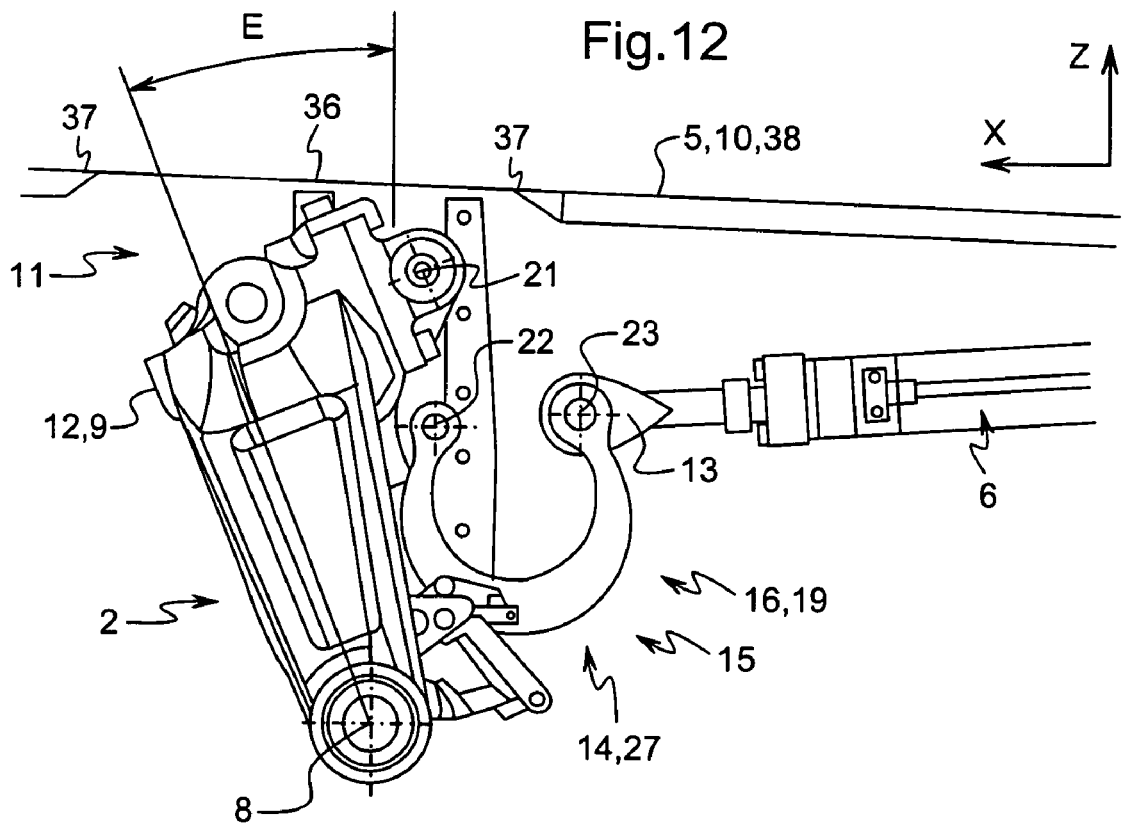

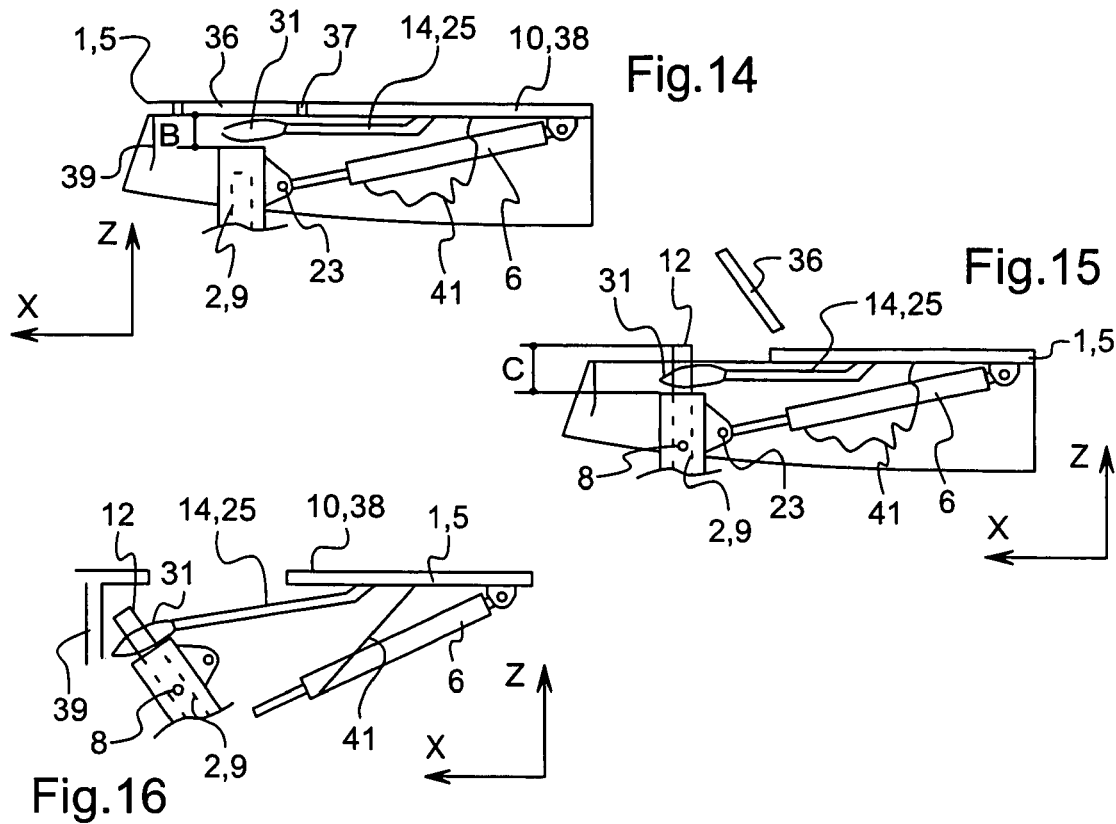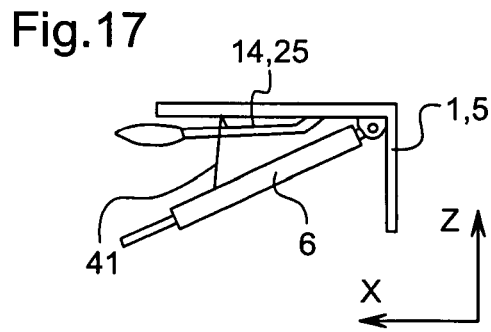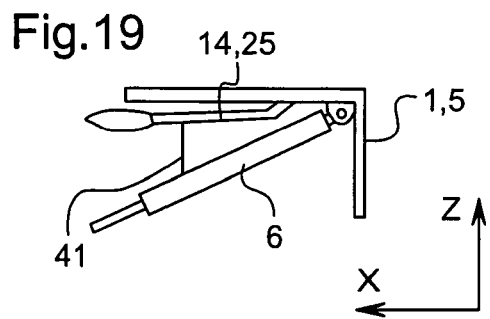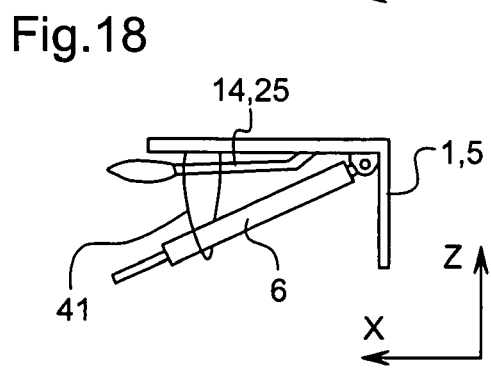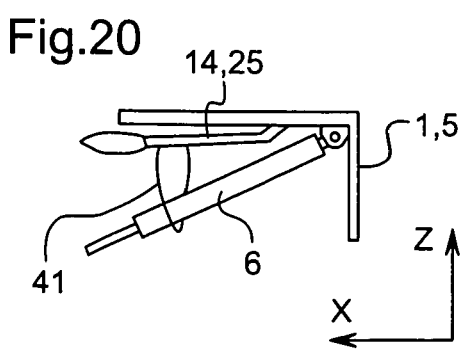

ANTI-CRASH METHOD AND SYSTEM, AN UNDERCARRIAGE, AND AN AIRCRAFT

The invention relates to the field of the specific operation of an aircraft undercarriage in the event of an emergency landing.

Such an undercarriage is sometimes referred to as "landing gear" and an emergency landing is referred to as a "crash".

The invention relates in particular to an anti-crash method and system for an aircraft undercarriage, e.g. for a rotary wing aircraft.

BACKGROUND OF THE INVENTION

In numerous aircraft, and in particular for improving drag and fuel consumption, undercarriages are provided that are mounted in retractable or foldable manner.

Amongst such undercarriages, the invention relates more particularly to "straight" landing gear.

In order to be retractable, straight landing gear comprises a leg with at least one wheel mounted at its bottom end, the leg being pivotally mounted about a transverse main axis in order to be capable of being retracted into a well in the fuselage, under drive from a retraction actuator.

At present, anti-crash functions are rare in retractable straight landing gear. When such functions are present they are in practice limited or inadequate according to the applicable standards.

By way of illustration, mention is made of patent document FR 2 687 123 which describes a retractable helicopter landing gear.

In order to deal with a crash landing situation in spite of the short stroke of its resilient leg, that landing gear includes an additional device for absorbing energy and presenting a force threshold, which device is integrated in the driving actuator.

In the event of a crash landing, the actuator remains hinged to the landing gear leg and the absorption device allows the landing gear to rise with controlled pivoting.

With such straight landing gear, two main stages are observed during a crash, giving rise to anti-crash functions that are dedicated, i.e. that are specific for each stage, and in particular:

a first stage when the undercarriage comes into contact with the landing surface, during which it is appropriate to provide a first damping function seeking to absorb the energy of axially shortening the undercarriage; and a second stage of a crash, generally after the first stage, during which it is appropriate to brake pivoting of the landing gear leg.

In practice, proposals that have been made in the past for retractable straight undercarriages have related solely to anti-crash functions that are specific to the first stage.

In such undercarriages, this specific function is damping that is obtained by means of a sliding tube (e.g. made of composite material, and in particular of carbon).

In the event of a crash, the tube can slide substantially along the direction of the central axial fiber of the landing gear leg, and relative to the axis about which the leg is retracted into the well. In normal, non-crash operation, this sliding is prevented by a shear bolt.

If the speed with which the wheels make contact on landing reaches a threshold value equal to a crash speed, this causes the shear bolt to shear.

This shearing in turn releases the sliding tube so that it can slide away from the functional position of the landing gear leg.

The tube then moves substantially along the direction of the central axial fiber of the landing gear leg at substantially constant force, absorbing the energy generated during the first stage of a crash.

During the first stage of a crash, the normal retraction function of the actuator is inhibited because of the axial shortening speeds of the undercarriage (of the order of 8 meters per second (m/s) to 11 m/s, as compared with less than 1 m/s during a normal landing).

According to document FR 2 687 123, once the retraction function has been inhibited, the actuator absorbs the energy coming from the pivoting of the landing gear leg about its main retraction axis.

It is this absorption device integrated in the control actuator that limits and controls pivoting, which constitutes the main part of the second stage of a crash.

However with known straight landing gear, the landing gear leg tends to rise violently towards the inside of the aircraft, beyond the well for receiving it.

In addition, the inhibition of the retraction actuator at the end of the first stage of a crash allows the compression energy of the undercarriage tires to be released.

This energy release further increases the upward pivoting acceleration of the landing gear leg during the second stage of a crash.

Furthermore, with certain existing straight landing gear, during a crash, there is a longitudinal offset in the forward direction of the aircraft between the central axial fiber of the leg and the axis of its wheel(s)

Such an offset is common, e.g. in steerable nose landing gear, in order to make the aircraft easier to taxi by steering its wheels.

Because of the additional lever arm this generates, it is found during the second stage of a crash that acceleration of the landing gear leg as it rises is increased.

This leads to initial pivoting of the undercarriage during the second stage of a crash, typically through an angle of about 90° with an angular speed of substantially 40 radians per second (rad/s), for example.

For a retractable straight undercarriage weighing about 70 kilograms (kg), the force generated in this way can be of the order of 35000 newtons (N).

There is then a risk of structural damage being generated in particular to the top wall of the landing gear well and the adjacent structures, e.g. within the floor of the cabin for nose landing gear.

Unacceptable human injury is also likely to be caused during the second stage of a crash if the people are close to the landing gear.

At this stage, mention can be made of other documents in the technical field of anti-crash installations for aircraft.

Document FR 2 472 115 describes equipment for braking a body in movement, the equipment comprising strips that are theoretically not elastic and that are suitable for receiving the impact of the moving body.

The strips are connected to adjustable braking means.

Document FR 2 316 483 describes an auxiliary device for absorbing kinetic energy for an airplane stop barrier situated on a landing ground or zone.

That device constitutes a brake made entirely of textile material, having no mechanical moving parts, and of small bulk. The brake comprises coiled straps held by destroyable retaining means such as stitching and connected to the barrier.

As a result, when an airplane for stopping is caught in the barrier, the straps separate progressively by breaking fibers, thereby braking and then stopping the airplane.

Applications for such equipment are to be found in particular at the ends of runways or on aircraft-carrier landing decks. Furthermore, the equipment may be associated with a load for releasing from an airplane, helicopter, or balloon, in order to protect it from the effects of making contact with the ground.

Document FR 2 684 957 describes a peak-limiter device for shock absorbers for helicopter landing gear.

A shock absorber comprises a piston rod disposed at the bottom and a main cylinder at the top. The piston rod and the main cylinder are hinged via end ball-joints, respectively at the bottom to a component of the landing gear and at the top to a structure of the helicopter.

That landing gear is not steerable, and the peak-limiter device is always integrated in the shock absorber.

Mention is also made of documents of interest relating to landing gear.

Document FR 2 689 087 describes a retractable undercarriage for an aerodyne, such as a helicopter.

A landing gear leg is pivotally mounted on a structure of the aerodyne to pivot about an axis that is essentially perpendicular to its longitudinal midplane.

A controlling actuator is associated with the landing gear leg to extend it and to retract it.

In addition, the actuator serves as a force threshold shock absorber, applying a predetermined torque tending to hold the landing gear leg in the position it occupies during landing, while allowing it to rise under controlled force in the event of a crash landing.

Above a predetermined threshold, corresponding to a crash landing situation, the wheels of the undercarriage transmit a large force to the undercarriage leg.

When the force threshold is exceeded, the shock absorbing actuator allows the landing gear leg to pivot in the retraction direction.

Document FR 2 689 088 describes a shock absorbing actuator for a helicopter that includes a function of limiting force in the event of a crash.

It also includes a brace and performs functions of controlling the undercarriage, absorbing shock, and peak-limiting forces.

U.S. Pat. No. 5,944,283 describes a shock absorber for an anti-crash undercarriage. Its rocker axis is offset.

However the teaching of the above, in particular, does not make it possible to obtain anti-crash functions that are effective for a retractable straight airplane undercarriage.

In particular, functions are not available in practice for providing structures, and humans, on board the aircraft with effective protection during the second stage of a crash.

In order to make this second stage of a crash safer, adapting solutions that are designed for the first stage leads to numerous drawbacks that are excessive if not insuperable.

In providing protection during this second stage of a crash, it is also possible to comply in particular with the following criteria:
  major modifications to the environment of an undercarriage (preexisting or being designed) should be avoided;
  the additional on-board weight should be small or negligible:
  the additional bulk should be small or negligible;
  safety should be provided effectively against the forces involved;
  the dynamics involved should be compatible with normal operation and first stage anti-crash operation;
  cost and ease of installation and maintenance should be as small as possible; and
  the additional means should be both robust and long-lasting.

These criteria are even more severe for rotary wing aircraft where questions concerning undercarriage size and stability during landing are particularly constraining.

In terms of safety during the second stage of a crash, the invention ought to provide, for example:
  compatibility with an impact speed of about 7 m/s to 9 m/s, e.g. about 8.2 m/s;
  compatibility with the undercarriage pivoting during the second stage at a speed greater than or equal to 10 rad/s;
  the landing gear leg should be allowed to pivot freely and in controlled manner before anti-crash braking is applied, over respective predetermined angles; and
  the maximum impact forces on the structure of the aircraft (e.g. the floor above the landing gear well for a nose undercarriage) at the end of the second stage stroke of the undercarriage compatible with the strength of the surrounding structure, in order to avoid damaging it.

For example, up to a value of about 25,000 N, crash impact forces should not be transmitted to the take-up structure, and the energy thereof should be absorbed.

It is also appropriate that safety standards, both present standards and future standards, should be complied with in order to ensure that an aircraft of the invention can obtain type approval quickly and easily.

OBJECT AND SUMMARY OF THE INVENTION

The object of the invention is thus to mitigate the problems and to comply with as many as possible of the criteria mentioned.

To this end, the invention provides in particular for:
  dissociating the functions that are undertaken while not crashing, in particular retraction and/or shock absorbing, from the functions that are specifically anti-crash functions, in particular for the second stage of a crash;
  dedicating at least some of the specific anti-crash functions to certain means, in particular for the second stage of a crash; and
  maintaining the retraction actuator substantially in the position and the state in which it was to be found at least on entry into the second stage of a crash.

To some extent, these technological options appear somewhat paradoxical, since:
  dissociating non-crash functions can appear a priori to contradict the usual objectives of functional integration that are commonplace in the field of aviation;
  the use of dedicated anti-crash means can appear a priori to contradict the usual objectives in the field of aviation of reducing on-board weight and bulk;
  blocking the retraction actuator, but without making use of it as means for absorbing energy can appear a priori to contradict present practice in the field of transport, which seeks in the event of a crash to make the greatest possible use of components as absorption or protection means; and
  the functional transparency of the functions specific to the second stage of a crash, during normal operation of the landing gear, and consequently the integration thereof in a linkage during a crash can appear a priori to contradict obtaining immediate reactivity as is looked for in the field of aviation.

However, contrary to those prejudices, the invention obtains, surprisingly, the following in particular:
  by dissociating the non-crash functions, crash forces are transmitted in channeled and simplified manner to dedicated components of the structure (thereby saving on-board weight and reducing manufacturing costs and maintenance costs for the means that perform these non-crash functions, both within the landing gear and within the take-up structure of the aircraft);

by using dedicated anti-crash means, these means can present performance, lifetime, and verification requirements that are optimized independently of their environment, and can present the possibility of increased control over free movements or energy absorption within the landing gear;

by blocking the retraction actuator, but without that causing it to become energy absorption means, it can either be bypassed or else used for crash force transmission purposes;

by being selectively integrated only during the second stage of a crash, it can be guaranteed that the crash-specific functions are degraded as little as possible during normal use of the landing gear; and by keeping the retraction actuator in position, risks of interference are reduced or even eliminated.

On the same lines, it can be seen below that by making use of plastic deformation to absorb crash energy during the second stage, the invention avoids any risk of failure of the kind that is specific to hydraulic systems, for example.

In addition, because the invention dissociates non-crash functions, landing gear components distinct from those providing crash-specific functions can be used for obtaining additional results, such as additional braking at the end of a crash stroke by causing the distinct components of the landing gear to come into contact with a deformable zone of their surroundings.

It should be observed that after the retraction actuator and the landing gear leg have been released relative to each other, i.e. once the leg is functionally separated from the actuator, the actuator tends to drop by pivoting about its transverse anchor hinge to the take-up structure of the aircraft.

Consequently, during the second stage of a crash, the retraction actuator as functionally separated could firstly come into contact with the landing surface via its released connection end, and violently strike the top of the landing gear well, possibly penetrating therethrough into functionally vital portions of the aircraft or portions that are occupied by humans.

Secondly, when functionally separated in this way during the second stage of a crash, the retraction actuator could impede proper operation of other members of the aircraft.

In either circumstance, the risk of unacceptable human and/or structural damage is large and needs to be mitigated.

It will thus be understood that a particular object of the invention is to mitigate those risks that are specific to the second stage of a crash.

To this end, in one aspect, the invention provides an on-board anti-crash method for an undercarriage of an aircraft, e.g. a rotary wing aircraft, said undercarriage being of the retractable type, and comprising at least:

a landing gear leg hinged to a force take-up structure of the aircraft about a transverse pivot axis in order to enable it to be extended and retracted;

a retraction actuator having a coupling end hinged to the take-up structure in order to cause the landing gear leg to be extended and retracted;

first anti-crash means for acting during a first stage of a crash to damp shortening of the undercarriage; and second anti-crash means for acting during a second stage of a crash to inhibit retraction and to brake pivoting of the leg.

According to the invention, during a second stage of a crash, after the end of the first stage, the method provides at least the following additional steps or functions:

functionally separating the landing gear leg relative to the retraction actuator;

retaining and blocking the retraction actuator; and once the actuator has been blocked, providing controlled braking of the pivoting of the landing gear leg about its transverse axis.

In an implementation, the step of braking pivoting is performed at least in part by a stage of irreversibly lengthening a deformable connection between the take-up structure and the landing gear leg, e.g. at substantially constant force.

In an implementation, the lengthening stage is performed at least in part by at least one partial destruction action enabling the deformable connection to extend in controlled manner, e.g. with said connection between the take-up structure and the landing gear leg being direct.

In an implementation, the lengthening stage is performed at least in part by at least one plastic deformation action enabling the deformable connection to be deployed in controlled manner, e.g. with said connection between the take-up structure and the landing gear leg being indirect, and including a force-relay function between the structure and the leg.

In an implementation, the elongation stage is performed at least in part by a stage of extending by partial destruction a non-permanent connection between the structure and the leg, e.g. with said connection being obtained by causing a member of said connection to become engaged prior to the second stage of a crash.

In an implementation, said connection is caused to become engaged prior to the second stage of a crash by a sliding tube of the landing gear leg being caused to engage with a collar or the like.

In an implementation, the lengthening stage is performed at least in part by a stage of deploying a permanent connection between the structure and the leg, e.g. said connection actuating tilting between the landing gear leg and the retraction actuator, said actuator remaining hinged to the leg during the second stage of a crash.

In an implementation, the leg is allowed to pivot freely prior to braking through a predetermined amplitude, e.g. lying in the range 1° to 30°, and in particular about 90° or about 22° when the total amplitude of pivoting movement of the leg is about 90°.

In an implementation, the step of braking the leg about the transverse axis is provided in part by putting the leg into contact with a stop for absorbing energy of the crash during the second stage of a crash, followed by the stop being deformed plastically by the leg, e.g. by means of a sliding top end tube of the landing gear leg deforming a stop that comprises a front wall of a well for receiving the landing gear at the end of the second stage of a crash.

In an implementation, during the first stage of a crash, a top portion of the landing gear leg slides substantially upwards and strikes a releasable zone in a top wall of a well for receiving the landing gear, and separates said zone from the top wall, without significant absorption of energy.

In an implementation, the steps of retaining the actuator in an out-of-the-way position and of applying controlled braking to the landing gear leg are performed simultaneously, at least in part, or indeed together in parallel.

In an implementation, the functional separation of the landing gear leg relative to the retraction actuator is performed by separation proper, e.g. by means of a shear bolt which, once sheared by the leg shortening, releases a mechanism for retaining the actuator in its functional position so that a connection end of the actuator is detached from the leg.

In an implementation, the functional separation of the landing gear leg relative to the retraction actuator is performed by tilting the connection which is permanent and indirect, e.g. a shear bolt, which, once sheared by the leg shortening, releases a mechanism for retaining the actuator in its functional position so that a connection end of the actuator is released relative to the leg, while a stationary hinge enables the connection to tilt to a position in which the connection end and the stationary end of the actuator are in alignment with an attachment zone where the permanent connection is attached to the leg.

In another aspect, the invention provides an anti-crash system for an undercarriage for use on board an aircraft.

The undercarriage is of the retractable type, possessing at least: a landing gear leg mounted to pivot about a transverse axis on a force take-up structure of the aircraft; a leg retraction actuator arranged to cause the leg to be extended and retracted, the actuator having a coupling end hinged to the structure.

The system comprises at least:
first anti-crash means arranged to damp the shortening of the undercarriage during a first stage of a crash; and
second anti-crash means arranged to inhibit retraction and also to brake pivoting of the leg during a second stage of a crash.

According to the invention, the system comprises at least:
means for functionally separating the landing gear leg relative to the actuator at the end of the first stage of a crash;
within the second anti-crash means, devices for retaining and blocking the actuator; and
within the second anti-crash means, a device for applying controlled braking to the pivoting of the landing gear leg, said device being distinct from the retraction actuator.

In an embodiment, the system is suitable for implementing the method as described above.

In an embodiment, the means for functionally separating the leg from the actuator are means for separation proper distinct from the connection, e.g. a shear bolt arranged to release a mechanism for retaining the actuator in the functional position so that a connection end of the actuator is detached from the leg.

In an embodiment, the means for functionally separating the leg from the actuator are tilt means of the connection that is permanent, e.g. a shear bolt arranged to release a mechanism for retaining the actuator in its functional position in such a manner that one end of the actuator is released relative to the leg while a stationary hinge of the actuator enables the permanent connection to tilt as far as a position in which the connection end and the stationary end are in alignment with an attachment zone where the connection is attached to the leg.

In an embodiment, the retention device is arranged so that the actuator is held substantially in a position where it is out of the way of the leg and is secured to the take-up structure.

In an embodiment, the retention device is at least in part directly secured to the take-up structure, e.g. said device comprises at least:
a strand rigidly secured at one of its ends to a wall of the structure such as a floor, while its other end is rigidly secured to the actuator; and/or
a strand rigidly secured at both of its ends to a wall of the structure, such as a floor, thereby forming a catenary type cradle in which the actuator rests.

In an embodiment, the retention device is at least in part secured indirectly to the take-up structure, e.g. said device comprises at least one strand secured to a braking device, e.g. said strand is integrated in a braking device having straps and/or is rigidly secured to a wall of the structure, such as a floor, with:
one of the ends of the strands being rigidly secured to the braking device, while its other end is rigidly secured to the actuator; and/or
both of the ends of the strand being rigidly secured to the braking device, the strand forming a catenary type cradle in which the actuator rests.

In an embodiment, the device for blocking the actuator forms part of the first anti-crash means, e.g. said blocking device is integrated at least in part in the actuator and is connected to at least one sensor of speed and/or system integrity and/or forces applied to the landing gear in order to block the retraction actuator in the position in which it is to be found when a value measured by the sensor becomes equal to a predetermined crash value.

In an embodiment, the braking device of the second anti-crash means is secured firstly directly or indirectly to the take-up structure, and secondly to the landing gear leg, e.g. to an attachment zone or to a sliding tube.

In an embodiment, the braking device and the retaining device of the second anti-crash means are formed at least in part if not completely by the same components, e.g. at least one of the components for securing the braking device and/or the landing gear leg to the structure is the same as a component for securing the retention device.

In an embodiment, the braking device and the retention device of the second anti-crash means do not include any pneumatic, hydraulic, or electrical components for control and/or servo-control purposes, e.g. said braking and retention devices are entirely mechanical.

In an embodiment, the braking device and/or the retention device of the anti-crash means are retained substantially in a longitudinal direction, e.g. in a position in which the retention device at least is out of the way, and/or in an end-of-stroke position of the braking device.

In an embodiment, the braking device of the second anti-crash means possesses at least one connection member for irreversible deformation by controlled elongation, e.g. at substantially constant force.

In an embodiment, at least one connection member is of the type for lengthening by partial destruction, enabling the deformable connection to extend in controlled manner, e.g. said connection is direct between the take-up structure and the landing gear leg.

In an embodiment, the deformable connection between the structure and the leg is not permanent, e.g. said connection is effective when it includes a sliding tube of the leg that is engaged within the connection by the first anti-crash means, said tube serving to engage the leg with a collar or the like of the braking device.

In an embodiment, at least one connection member is of the type that lengthens by controlled plastic deformation, enabling the deformable connection to deploy in controlled manner, e.g. said connection between the take-up structure and the landing gear leg is indirect and includes a component for relaying crash forces from the leg to the structure.

In an embodiment, the deformable connection between the structure and the leg is permanent, e.g. said connection between the landing gear leg and the retraction actuator is tiltable, the actuator remaining continuously hinged to the leg and acting as a component for relaying crash forces form the leg to the structure.

In an embodiment, the braking device of the specific anti-crash means includes means allowing the leg to move freely relative to the structure over an angle of limited amplitude at the beginning of the second stage, prior to braking, e.g. means allowing free pivoting through an angle of about 1° to 30°, e.g. for the leg pivoting through a total angle of about 90°, said angle being about 9° for a braking device that is extensible and not permanent, while it is about 22° for a braking device that is for deployment and permanent.

In an embodiment, the braking device for braking the leg comprises a stop for absorbing crash energy during a second stage of a crash by deforming plastically, e.g. said stop comprises a front wall of a well for receiving the landing gear, which wall is deformed at the end of the second stage of a crash by a top end sliding tube of the landing gear leg.

In an embodiment, the plastic deformation member comprises at least one horseshoe-shaped part suitable for deforming by irreversible straightening and/or a tube-shaped part suitable for deforming by irreversible shortening, e.g. the connection possesses two horseshoe-shaped parts arranged symmetrically on either side of a midplane in longitudinal elevation.

In an embodiment, a single horseshoe-shaped part is arranged substantially in a midplane in longitudinal elevation and includes both a moving hinge connected to a connection end of the actuator and a hinge connected to an attachment zone of the leg, the hinges of the horseshoe-shaped part having axes extending substantially along a transverse direction.

In an embodiment, the connection member is not permanent, being extended by partial destruction, and comprises at least one strap coiled in at least one series of loops that are held coiled by destroyable retaining arrangements, e.g. said arrangements comprising stitches and/or adhesive and/or heat-sealing which on being destroyed allows the connection strap to be deployed in controlled and progressive manner.

In an embodiment, the connection member comprises at least one strap having its coiled portion acting as the portion suitable for being subjected to the destruction action, e.g. said strap is arranged in a cradle so as to form a portion of the device for retaining the actuator, said portion thus extending close to and at least partially around a bottom portion of said actuator.

In an embodiment, the connection member comprises three straps disposed in a U-shaped cradle, together with firstly a rear hinge fitting connected to the take-up structure and secondly a front collar for surrounding the landing gear leg, e.g. a central strap of the U-shaped cradle is disposed over the actuator and under the floor of the structure, with two side straps extending downwards from the central strap.

In an embodiment, the collar is made of very high strength steel such as steel of the Z15CM17.03 type.

In an embodiment, the member forming the U-shaped cradle comprises at least:
- a transverse central bottom strap arranged substantially in a longitudinal and transverse plane; and
- two side straps forming the limbs of the U-shape and arranged on either side of the bottom strap, substantially symmetrically about a midplane in longitudinal elevation.

These straps are hinged in slots through which they are looped, each via its longitudinal ends firstly to the rear hinge fitting of the structure, and secondly to the front collar encircling the landing gear leg.

In an embodiment, the connection member that is not permanent and that is partially destroyed during controlled deployment comprises at least two controlled-rupture connection elements for holding a front collar around the landing gear leg, temporarily until the second stage of a crash.

The invention also provides an anti-crash undercarriage for an aircraft, e.g. a rotary wing aircraft; the undercarriage is retractable and possesses at least: a landing gear leg pivotally mounted about a transverse axis on a force take-up structure of the aircraft; a leg retraction actuator arranged to cause the leg to be extended and retracted, the actuator having a coupling end hinged to the take-up structure.

The undercarriage is coupled to an anti-crash system as mentioned and/or is suitable for implementing the method set out above.

The invention also provides an aircraft, e.g. a rotary wing aircraft.

The aircraft is suitable for implementing the above method and/or includes at least one system and/or at least one undercarriage as described above.

According to the invention, the take-up structure includes at least one releasable wall surrounded by a zone of weakness such as an assembly by means of adhesive and/or rivets and arranged so that during a first stage of a crash, a portion of a landing gear leg comes to strike said top wall and separate it from the remainder of the structure in the location of the zone, without significant absorption of energy.

In an embodiment, the take-up structure includes at least one stop for absorbing crash energy during a second stage of a crash by deforming plastically, e.g. said stop comprising a front wall of a well for receiving the landing gear, which wall is deformed at the end of the second stage of a crash by a top end sliding tube of the landing gear leg.

BRIEF DESCRIPTION OF THE DRAWINGS

The invention is described below with reference to embodiments given in non-limiting manner and shown in the accompanying drawings, in which:

FIG. 11 is a fragmentary view similar to FIG. 5, showing in detail an undercarriage and an anti-crash system in accordance with the invention, in which a connection member with controlled lengthening comprises a plastically-deformable horseshoe-shaped part;

FIG. 12 is a view similar to FIG. 11, showing in detail the horseshoe-shaped connection member in a tilted state at the end of its free stroke prior to being deployed plastically, i.e. shortly after the beginning of the second crash stage;

FIG. 14 is a diagrammatic fragmentary side view showing a state in accordance with the invention in which the top of the landing gear leg is at a distance from a collar of the braking device, and the retraction actuator is held by a strand secured to the floor forming the top of the landing gear well;

FIG. 15 is a view similar to FIG. 14 showing a state at the end of the first stage of a crash in accordance with the invention, in which the top of the landing gear leg has undone a zone of weakness and has engaged in a braking collar, the actuator that is functionally separated from the leg still being held by a strand fastening it to the take-up structure;

FIG. 16 is a view similar to that of FIG. 15, showing a state at the end of a second crash stage of the invention in which the top of the landing gear leg has just struck an abutment-forming zone of the take-up structure, in order to complete braking of the still-engaged collar;

FIG. 17 is a diagrammatic fragmentary side view showing an embodiment in accordance with the invention of the strand for retaining the retraction actuator during the second crash stage, which strand is single and secured to the ceiling of the take-up structure;

FIG. 18 is a view similar to FIG. 17, showing an embodiment in accordance with the invention of a pair of retention strands secured to the ceiling of the take-up structure and surrounding a braking device;

FIG. 19 is a view similar to FIG. 17, showing an embodiment of the invention, having a single retention strand secured indirectly to the take-up structure via a braking device that is deformable by irreversible lengthening; and FIG. 20 is a view similar to FIG. 17 showing an embodiment in accordance with the invention, having a pair of retention strands secured indirectly to the take-up structure via a braking device.

MORE DETAILED DESCRIPTION

Figure 1:
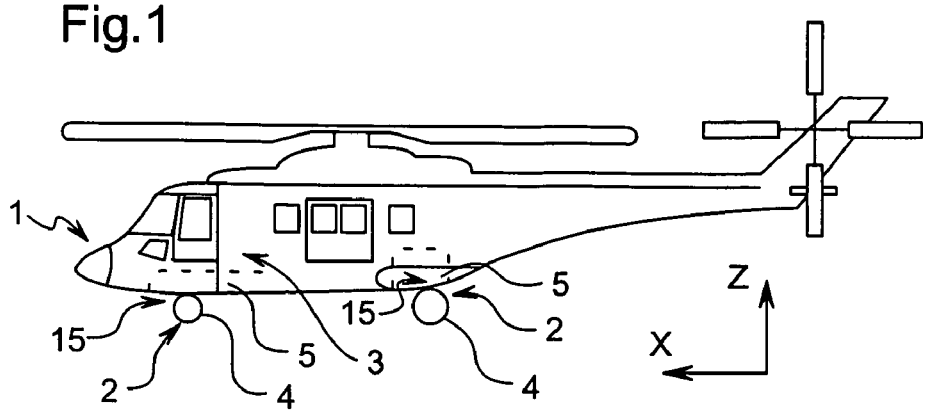
FIG. 1 is a diagrammatic longitudinal elevation view of a rotary wing aircraft in accordance with the invention, specifically a helicopter, shown with its leading or "nose" end to the left and with its rear or "tail" end to the right.

There follows a description of embodiments of the invention.

In the drawings, in which similar elements are identified by the same reference numbers, there can be seen three mutually orthogonal directions.

An elevation direction Z corresponds to the height and the thickness of the structures described: the terms high/low or top/bottom are relative thereto; to simplify, this Z direction is sometimes said to be vertical.

Another direction X that is said to be longitudinal corresponds to the long or main dimension of the structures described. The terms such as front/rear refer thereto; to simplify, this X direction is sometimes said to be horizontal.

Yet another direction, Y, is said to be transverse, corresponding to the width or lateral dimensions of the structures described. The term "side" refers thereto; to simplify, this direction Y is sometimes considered as being horizontal.

Together the X and Y directions define a so-called "main" X, Y plane (perpendicular to the plane of the sheet of FIG. 1) within which there is inscribed a support polygon and a landing plane.

In FIGS. 1 to 4, 8, and 11, the reference 1 is an overall reference to a rotary wing aircraft. Specifically, the aircraft 1 is a helicopter.

In FIGS. 1 to 11, the X direction arrow points towards the front of the aircraft 1. When a component of the aircraft 1, such as landing gear 2 or an undercarriage is located close to a longitudinal end of the aircraft 1 that is near to its front, the component is said to be a "nose" component.

This applies to the nose undercarriage 2 which is shown in FIGS. 2, 5, 8, and 11, although the invention applies to other types of undercarriage for aircraft 1.

Figure 2:
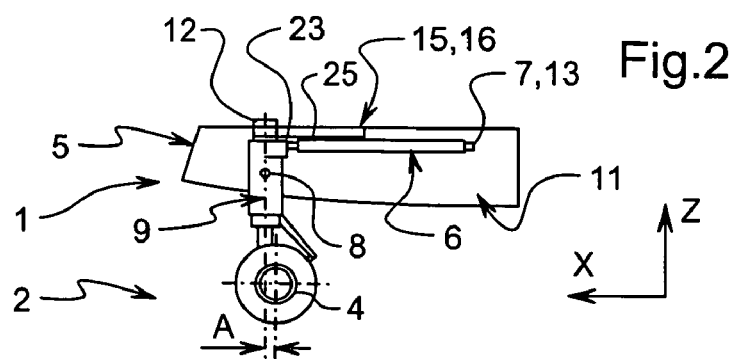
FIG. 2 is a diagrammatic fragmentary side view showing in detail a structure for taking up aircraft forces with a landing gear well together with a retractable nose undercarriage in accordance with the invention, in a state immediately prior to coming to the end of a first crash stage, with the top of a landing gear leg projecting into the top wall of the landing gear well, with a retraction actuator still functionally connected to the leg, and with an anti-crash system for the second stage that has already captured the landing gear leg for the purpose of braking it.

Within this helicopter 1, there can be seen in particular in FIG. 1 or 2, a structure 5 for taking up forces. Such a structure 5 provides the fuselage 3 of the aircraft 1 with a high degree of strength and safe behavior in the event of a crash.

Conventionally, each undercarriage 2 possesses at least one wheel 4.

In FIGS. 1 to 5, the undercarriage 2 possesses two wheels 4 disposed transversely on either side and sharing a common axis extending substantially perpendicularly to a longitudinal elevation midplane (X, Z) of the aircraft 1.

In these figures, the longitudinal elevation plane (X, Z) coincides with the plane of the sheet.

Figure 3:
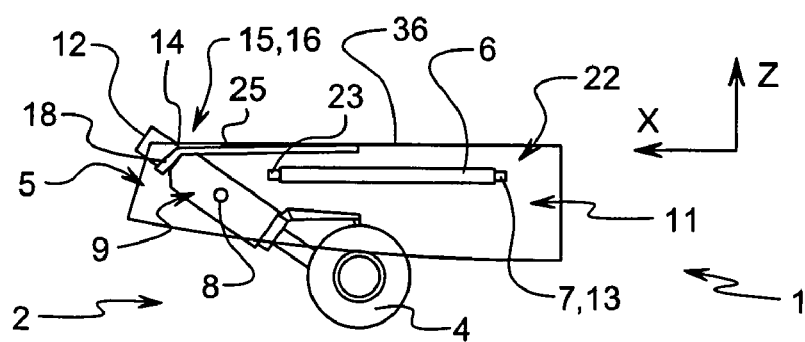
FIG. 3 is a view similar to FIG. 2 showing the undercarriage in accordance with the invention in a state during a second crash stage following the first stage, with the landing gear leg pivoted into the landing gear well once the retraction actuator has become functionally separated from the leg, the anti-crash system serving to brake the leg and to hold the actuator in an out-of-the-way position.
Figure 4:
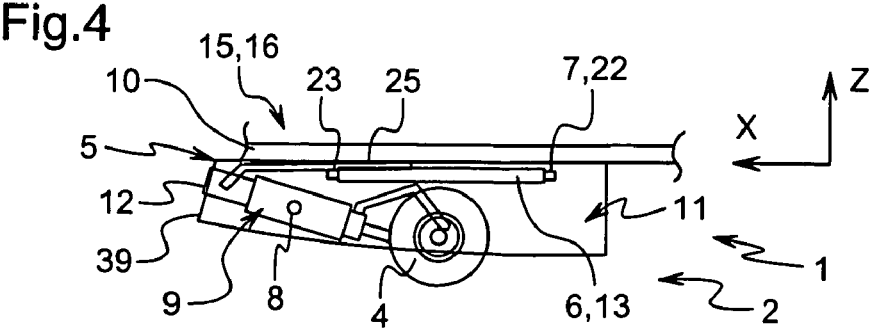
FIG. 4 is a view similar to FIGS. 2 and 3 in which the undercarriage of the invention is in its state at the end of the second crash stage, with the landing gear leg having completed its braked pivoting, and with the retraction actuator is still held in the out-of-the-way position.

In FIGS. 2 to 4, it can clearly be seen that the structure 5 possesses at least one anchor point 7 for pivotally mounting an actuator 6 for retracting the undercarriage 2.

In addition, the structure 5 possesses a main transverse axis 8 for pivoting a landing gear leg 9 of the undercarriage 2.

Thus, landing forces are taken up within the structure 5.

In the longitudinal direction X, there can be seen in FIG. 2 a rearward offset A between the central axial fiber of the landing gear leg 9 and the axis of the wheels 4.

From the above, it will be understood that the undercarriage 2 is of the straight and retractable type with the wheel 4 being offset.

Figure 5:
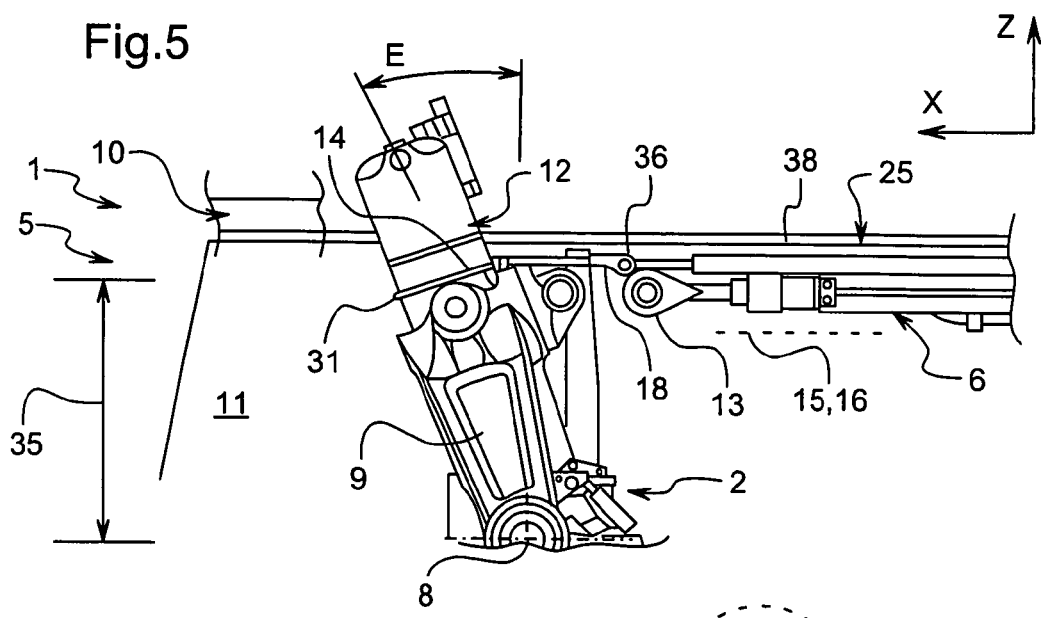
FIG. 5 is a fragmentary view similar to FIG. 2 showing in detail the undercarriage and the anti-crash system in accordance with the invention in which a connection member with controlled lengthening comprises a front collar and straps with controlled deployment.

In FIG. 3, 5, or 11, it can be seen that the structure 5 also includes a bottom structural floor 10 referred to as the cabin floor. This floor in embodiments that are not shown supports the anchor point 7 for the actuator 6 and/or the transverse pivot axis 8 for the landing gear leg 9.

In the embodiments in the figures, the force take-up structure 5 includes, substantially beneath the level of the structural floor 10, a well 11 into which the leg 9 of the undercarriage 2 can be retracted.

With such an undercarriage 2, at the end of the first crash stage, the top end 12 of the landing gear leg 9 comes close to a top wall of the landing gear well 11, as can be seen in FIG. 2, and specifically comes close to the structural floor 10. This can also be seen clearly in FIG. 5.

The first means for performing the anti-crash functions during the first crash stage are not shown, these means providing damping by shortening the undercarriage 2, in particular. Typically, these means comprise a tube that breaks progressively with predetermined amounts of force, e.g. a tube made of carbon.

In FIG. 3, it can be seen that the retraction actuator 6 is then functionally separated from the landing gear leg 9.

In FIG. 14, there can be seen an elevation distance B between the top of the landing gear leg 9 in the Z direction and the bottom face of the structure 5 (specifically a hatch 36 in a wall 38 of the floor 10). This distance B traveled by the end 12 of the leg 9 (specifically by its sliding tube), during the first stage of a crash defines the stroke over which the tube 12 can slide freely before striking the structure 5.

In FIG. 15, there can be seen another elevation distance C between the top in the Z direction of the end 12 at the end of its sliding movement, and its initial position before sliding. This distance C is traveled by the end 12 during the first stage of a crash. The distance C defines the total sliding path length for the tube 12 to the end of its stroke.

In certain embodiments, a top end of a sliding tube of a landing gear leg 9 leads to a shear bolt placed at the top end of the leg 9 being sheared, thereby releasing a mechanism for retaining the retraction actuator 6 in a functional position.

Typically, the shortening of the landing gear leg 9 leads, at the end of the first stage of a crash, to a bolt placed at the top portion 12 of the undercarriage 2 shearing.

This releases a mechanism for retaining the actuator 6 in a functional position. In one example, this retention mechanism is a hook connecting the actuator 6 to the top portion 12 of the landing gear leg 9.

The landing gear leg 9 is then free to pivot about its transverse axis 8, typically through an amplitude of about 90°.

This pivoting constitutes the essential portion of the second stage of a crash. It is during this stage that the landing gear leg 9 separated from the actuator 6 tends to rise violently towards the inside of the aircraft 1, beyond its retraction well 11.

Under the combined effects of releasing the compression energy of the tires on the wheels 4 and of the lever arm produced by the offset A, it is observed during the second stage of a crash, that the upward movement of the landing gear leg 9 accelerates strongly.

This runs the risk of leading to unacceptable damage during the second stage of a crash in the vicinity of the undercarriage 2.

Features and advantages of the landing gear 2 of the invention can be better understood in the light of the above.

In method terms, the invention performs functions that are on-board, as distinct from procedures that exist on the ground such as barriers or the like.

More particularly, in order to obtain excellent anti-crash safety, even during a second stage, attempts are made to retain the undercarriage 2 in an appropriate position and to absorb its pivoting energy during this second stage.

When, as a result of the landing gear leg 9 separating, only one connection end 13 of the actuator 6 remains hinged to the take-up structure (FIGS. 2 to 4), it is appropriate to ensure that the actuator does not impede the anti-crash functions of the undercarriage 2 and thus endanger the safety of the aircraft 1 and its occupants.

Thus, in accordance with the invention, during the second stage of a crash, following on from the first stage, provision is made:

firstly for a specific step or function of retaining the retraction actuator 6 that is functionally separated from the landing gear leg 9 substantially in a position where it is out of the way of the leg 9; and secondly a specific step or function is provided of braking the pivoting of the landing gear leg 9 about its transverse axis 8 in a controlled manner.

In the examples of FIGS. 4 and 5, the additional steps of retaining the actuator 6 in an out-of-the-way position and of controlling the braking of the landing gear leg 9 are performed simultaneously, at least in part. It should be observed that in the event of pivoting taking place freely prior to braking, retention can be effective before braking begins, as soon as the actuator 6 is released.

It can even be said that these steps are performed together and in parallel, since the actuator 6 is held constantly during braking.

In the embodiment of FIGS. 4, 5, and 11, the step of braking the pivoting of the landing gear leg 9 is provided at least in part by a stage of controlled lengthening of a deformable connection 14 having structural characteristics that are described below.

In the examples, the stage of controlled lengthening is provided entirely by deforming the deformable connection 14 with force that is substantially constant.

In the variants of FIGS. 4 to 10 (straps), the lengthening stage is performed at least in part by at least one partial destruction action enabling the deformable connection 14 to deploy in controlled manner.

In contrast, in the variant of FIG. 11 (horseshoe), the lengthening stage is performed at least in part by at least one action of controlled plastic deformation of the deformable connection 14.

It should be observed that in these variants, prior to the step of braking the pivoting of the leg 9 about the axis 8, the leg is allowed to pivot freely through an amplitude of about 9°.

From the structural point of view, the invention proposes an on-board anti-crash system 15 designed to co-operate with the undercarriage 2.

The system 15 comprises anti-crash means 16 that are specific to the second stage of a crash and having at least:

a device for retaining the retraction actuator 6 substantially in an out-of-the-way position (FIG. 5) relative to the landing gear leg 9; and a device for braking the pivoting of the landing gear leg 9 about its transverse axis 8 in controlled manner.

At this stage, it should be observed in FIG. 11 that the out-of-the-way position for the actuator 6 corresponds to its normal operating position, which actuator remains physically connected to the leg 9 of the undercarriage 2.

In the embodiments shown of the system 15, the braking and retention devices of the means 16 are formed at least in part by the same components.

This applies to rear and front connection elements 17 and 18 (FIG. 9 and FIG. 10) that thus form portions both of the braking device and of the retention device of the means 16. These elements are described in greater detail below.

More specifically, embodiments of the invention provide for the braking and retention devices of the means 16 to coincide from a structural point of view.

In variants that are not shown, the braking and retention devices of the means 16 could be integrated with each other in part only, or not at all.

In the embodiments shown, the braking device of the anti-crash means 16 possesses at least one connection member 14 that is deformable by controlled lengthening.

In the examples of the figures, each connection member presents controlled lengthening at substantially constant force levels.

Furthermore, it can clearly be seen from FIG. 8 or by imaging a view looking along the direction Z (i.e. a view on a transverse and longitudinal plane as seen from above or below), that the means 16 (whether embodied using straps or a horseshoe) extend generally substantially along the longitudinal direction X.

This applies in particular in the out-of-the-way position at least of the retention device and/or in an end-of-stroke position of the braking device.

Depending on the embodiment of the invention, the braking device of the anti-crash means 16 comprise means for traveling freely relative to the take-up structure 5.

These travel means leave the means 16 free over a limited amplitude at the beginning of the second stage, i.e. prior to braking the landing gear leg 9.

In the embodiment shown in FIG. 12, such travel means leave the means 16 to pivot freely through an angle E having an amplitude of about 9°. Typically, the total amplitude of the movement of the landing gear leg 9 about the transverse axis 8 in these embodiments is of the order of 90°.

In FIG. 11, the anti-crash means 16 possess a single connection member 19 in the form of a horseshoe.

This horseshoe-shaped member or part 19 is deformable in controlled lengthening substantially along the longitudinal direction X.

For this purpose, a curved central portion 20 of the horseshoe-shaped member 19 is suitable for being subjected to controlled plastic deformation.

In FIG. 11, it can be seen that the deformable curved portion 20 of the horseshoe-shaped member 19 extends substantially in the longitudinal elevation plane X, Z.

The horseshoe-shaped member 19 is also arranged between two hinges:
  a moving hinge 21 secured to one end of the connection 23 of the actuator 6 (i.e. indirectly to the take-up structure 5); and
  a stationary hinge 22 mounted on a fastener zone 24 of the leg 9 of the undercarriage 2.

Naturally the term "stationary" as used relative to the hinge 22 should be understood as allowing a certain amount of pivoting relative to the structure 5, e.g. during the free travel and the braked travel.

These hinges 21 and 22 of the horseshoe-shaped member 19 having axes extending substantially along the transverse direction Y, i.e. perpendicularly to the longitudinal midplane of the aircraft 1.

While it is lengthening, this curved portion 20 extends in the longitudinal direction X by plastic deformation. It should then be observed that the braking forces remain substantially linear throughout the deformation of the horseshoe-shaped part 19.

Its moving hinge 21 on the retraction actuator 6 then moves away from its other hinge 22 which is stationary, since said hinge is secured longitudinally to the leg 9.

From the above, it can readily be seen that the horseshoe-shaped member 19 naturally acts as a device for braking the means 16.

However this horseshoe-shaped member 19 also performs the retention function because of the permanent but deformable connection 14. The link 14 is deformed in this embodiment by turning relative to the hinges 21 and 22. Since the link 14 is permanent, the retraction actuator 6 is held in an out-of-the-way position, likewise by the member 19, which thus acts both as a retention device and as a braking device.

In another embodiment that is not shown, a plastic deformation member comprises at least one slider or tubular-shaped part suitable for deforming in extension, irreversibly like the member 19.

Such tubes can be found in anti-crash seats for aircraft.

In FIGS. 2 to 10, the braking device of the anti-crash means 16 possesses at least one member 25 providing a connection that is deformable by an action of partial destruction.

This partial destruction action enables the deformable connection member 25 to be deployed in controlled manner.

In the example of FIGS. 2 to 10, the member 25 is subjected to deformation after partial destruction at substantially constant force.

In this member 25, only certain portions, specifically initially coiled straps 26, are subjected to the partial destruction action that enables controlled deployment to take place.

In this embodiment, the member 25 comprises three straps 26 each coiled in at least one series of loops.

Depending on the embodiments, one or more straps are provided, each optionally being in series or in parallel.

Similarly, when a strap has a plurality of loops, they are arranged in series or in parallel depending on requirements.

The loops of the strap 26 are held coiled so that prior to a crash the member 25 presents a longitudinal dimension corresponding to the spacing in said X direction between the anchor point 7 of the actuator 6 for retraction to the structure 5 and the front of the landing gear leg 9 along the longitudinal dimension X.

It can then be said that the member 25 is in a compact state with the strap 26 coiled in loops.

Figure 6:
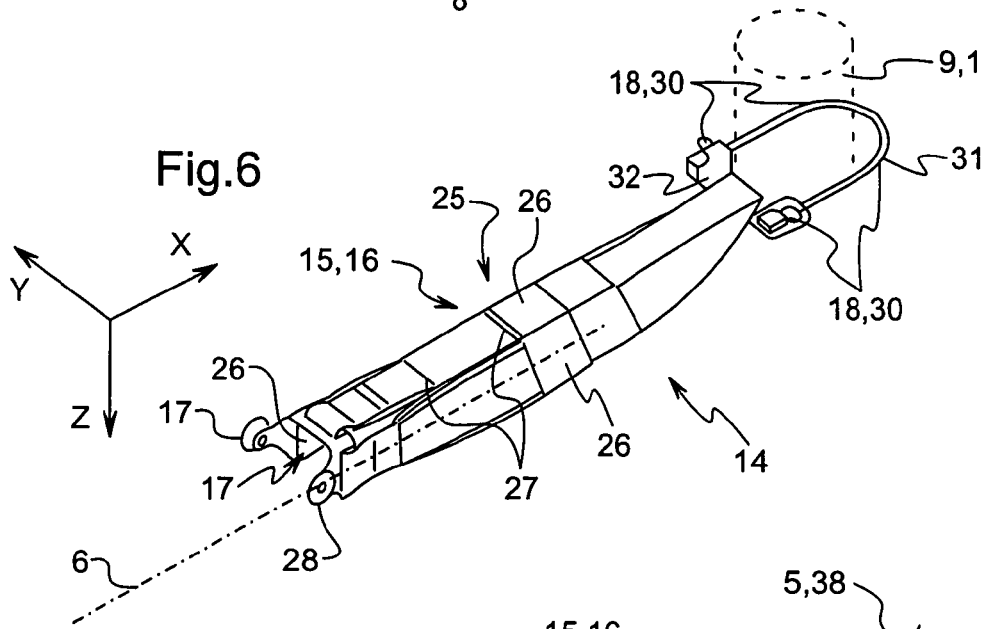
FIG. 6 is a longitudinal perspective view in elevation as seen from above with the forward end towards the right, showing the connection member having a cradle of straps and controlled deployment of an anti-crash system in accordance with the invention.

The loops of the strap 26 are kept coiled prior to a crash by destructible retention arrangements 27, that can be seen in FIG. 6.

In embodiments of the invention, these retaining arrangements 27 comprise:
  stitches; and/or
  adhesive; and/or
  welding.

In a second stage of a crash, the pivoting of the landing gear leg 9 about its transverse axis 8 (counterclockwise in FIG. 2 to 5) serves to destroy the arrangements 27, thus enabling the connection strap 26 to be deployed in controlled and progressive manner.

This destruction of the arrangement 27 takes place as the landing gear leg 9 is pivoting and thus pulling on the member 25.

The deployment of the strap 26 then absorbs surplus energy during the second stage of a crash, thereby braking the pivoting of the leg 9.

These straps have predetermined properties such that, at the end of the stroke of the landing gear leg 9, the kinetic energy delivered by the leg 9 to the adjacent structures is compatible with the safety requirements applicable to the aircraft 1 fitted with the invention.

Hardware and/or human damage can thus be limited or even made negligible or non-existent.

A feature of the collar part 31 that forms the front of the member 25 of the invention is that the collar 31 is arranged as a snare for the landing gear leg 9 when the actuator 6 is functionally separated from the leg 9.

In FIGS. 2 to 5, this out-of-the-way position is adjacent to the top wall of the retraction well 11, and thus close to or even against the structural floor 10.

It is appropriate to specify what should be understood when the actuator 6 is said to be "functionally separated" from the landing gear leg 9. This state of "functional separation" is shown in FIGS. 3-5, 12, 13, 15-20. This state is not incompatible with the connection 14 being permanent in these embodiments. It merely indicates that the actuator 6 is no longer in a position to extend and/or retract the leg 9.

Thus, in normal operation of the aircraft 1, the actuator 6 is hinged via its connection end 23 to the landing gear leg 9. This enables it to perform its functions of extending and retracting the undercarriage 2.

As described above, at the end of the first stage of a crash, this connection end 23 of the actuator 6 is separated from the landing gear leg 9.

Nevertheless, in order to be able to perform its braking function during the second stage of a crash, the member 25 acts via the collar 31 to remain in engagement with the leg 9.

In addition to interposing the member 25, locking takes place at the end of the first stage that prevents the actuator 6 from performing its functions of extending and retracting the undercarriage 2.

Typically, this locking is obtained by interrupting the functional flows within the actuator 6, thereby preventing it from moving in extension or contraction and holding it in the state in which it was to be found at the end of the first stage.

In contrast, the connection 14 between the member 25 and the leg 9 allows the leg 9 certain degrees of freedom that are incompatible with normal retraction, and serves to perform functions that are specific to the second stage of a crash, and in particular braking of the leg 9 and retention of the actuator 6 in an out-of-the-way position by means of the member 25.

Concerning this retention of the actuator 6 in an out-of-the-way position, it should be observed that in a version of the member 25 that is not shown but that is comparable to that of FIG. 6, the straps 26 form a cradle for performing at least part of the retention function required during the second stage of a crash.

Both in normal operation of the aircraft 1 and in the event of a crash, the cradle of straps 26 remains extended in the vicinity of the retraction actuator 6.

This serves to confine the actuator 6 in a space where it cannot interfere with the other components of the aircraft 1, which might prevent them from operating properly.

More generally, the connection member 25 as shown in FIG. 6 comprises a plurality of straps 26 arranged in a cradle and disposed in a U-shape on a plane perpendicular to the direction X, i.e. a transverse plane (Y, Z).

In FIGS. 5 and 6, the upside-down U-shaped cradle member 25 comprises three straps 26:

a strap 26 that is central in the transverse direction, lying substantially in a longitudinal and transverse plane (X, Y); and two lateral straps 26 forming the side limbs of the U-shape and arranged on either side of the central strap 26, substantially symmetrically relative to the above-mentioned longitudinal elevation midplane.

The three straps 26 in a U-shape are mounted longitudinally on the rear fastener element 17 to the take-up particular 5.

The straps 26 are also mounted on the element 18 for connection to the structure 5 towards the front, and thus close to the top of the landing gear leg 9.

In this embodiment, the member 25 is mounted by securing the elements 17 and 18 under the top wall 38 of the landing gear well 11. The rear element 17 is thus rigidly secured to the take-up structure 5, on a permanent basis, including during the second stage of a crash.

It is observed at this point that a central strap 26 lies against the wall 38 and above the actuator 6. The two side straps 26 are on either side of the actuator 6, with the U-shaped cradle thus being upside-down.

In contrast, it is shown below that during this second stage of a crash, embodiments provide for the front elements 18 to include controlled-rupture fasteners 30.

These fasteners 30 are arranged so that after the leg 9 has been captured by the collar 31, the front elements 18 separate from the structure 5 (e.g. from the wall 38), thus allowing the connection 14 to take up an alignment along the main direction of the braking forces. This can be seen clearly in FIGS. 15 and 16.

Figure 9:
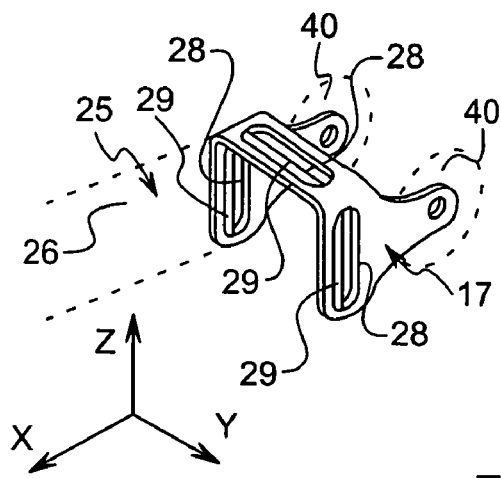
FIG. 9 is a perspective view in longitudinal elevation showing a rear hinge fitting as seen from in front showing slots through which the straps of an anti-crash system in accordance with the invention are looped.

In FIG. 9, it can be seen that the rear element 17 forms a hinge fitting on the structure 5. This fitting or element 17 also presents a U-shaped section in the transverse plane (Y, Z).

The straps 26 are looped through slots 28 in the element 17. Each strap 26 passes freely through one of the slots 28 where it is looped through 180° and secured to itself so that it is held to the element 27 in a manner that is strong and permanent.

It can be seen that in each slot 28 there is engaged a stiffener roll 29, e.g. coated in a slippery layer based on fluorocarbon resins such as polytetrafluoroethylene (PTFE) or fluorinated ethylene propylene (FEP).

The main function of these stiffener rolls 29 is to contribute to the element 27 absorbing high levels of force during the second stage of a crash and to limit the wear suffered by the straps 26 where they pass through the slots 28.

Figure 7:
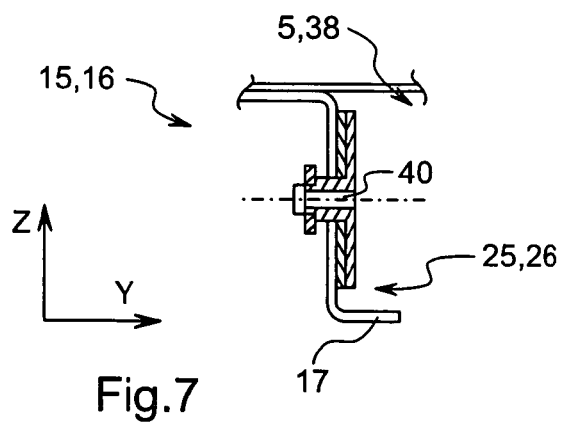
FIG. 7 is a diagrammatic elevation view in cross-section showing a rear support fitting for a connection member having straps of the anti-crash system in accordance with the invention, and more particularly a controlled-rupture fastener for fastening the connection member to the take-up structure of the aircraft.

With reference to FIG. 7, it can be seen how the front fitting or element 17 is mounted on the structure 5.

This element 17 is rigidly secured in normal operation of the aircraft 1 via pins 40 that extend transversely, relative to the orientation of the member 25 relative to the take-up structure 5.

Unlike the front element 18, the element 17 does not possess controlled-rupture fasteners 30. Only the front end of the connection 14 having the straps 26 becomes detached from the structure 5 during the second stage of a crash.

However, this detachment makes orientation possible by the element 17 turning about the pins 40. In FIGS. 15 and 16, this orientation of the member 25 takes place counterclockwise, i.e. in such a manner that the front of the member 25 moves away from the wall 38 in downward elevation when it turns.

During the second stage of a crash, the fasteners 30 break so as to release the member 25 in part.

By means of this partial release, the member 25 can remain close to its initial out-of-the-way position, but—as can be seen in FIG. 4 or FIG. 16—it is subjected to the traction force generated by the leg 9 pivoting, thereby moving it downwards a little about its anchor point 7 (e.g. via the rear element 17) to the structure 5.

Thus, the member 25 remains oriented substantially along the direction of the main forces to which it is subjected. This makes it possible to ensure that this member 25 opposes greater resistance while it is being stressed mainly in traction, and interfering forces are kept small because it has been released in part.

In FIGS. 2 to 6, each of the three straps 26 is mounted at its front end on the element 18 and on its rear end on the element 17, and they are secured via the transverse support 32 with the collar-forming part 31.

In the examples shown, this collar part 31 is made of very high strength steel, such as a steel of the Z15CM17.03 type.

Figure 8:
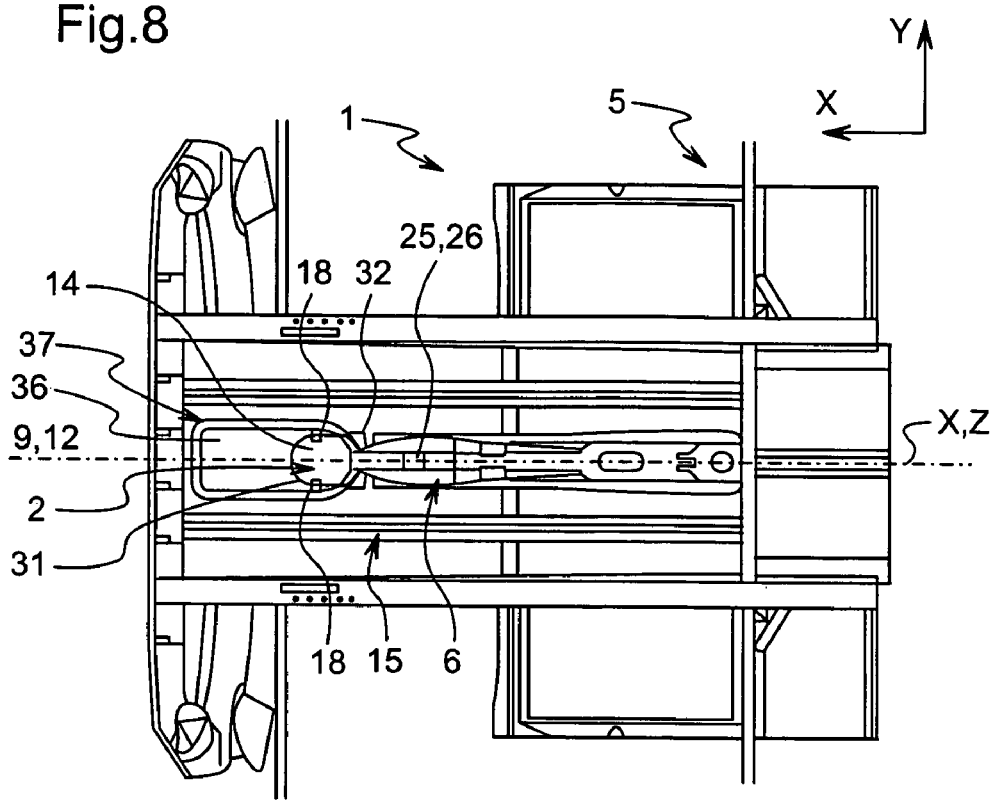
FIG. 8 is a fragmentary longitudinal and transverse plan view as seen from above showing in detail the landing gear, the take-up structure, and an anti-crash system in accordance with the invention (similar to that of FIG. 2), in which the front collar surrounding the landing gear leg can clearly be seen.

More generally, it can clearly be seen in FIGS. 6 and 8 that the member 25 possesses at the front of the straps 26 in the longitudinal direction:

a collar-forming part 31 located within the undercarriage 2 (above the top of the landing gear leg 9 before the second stage of a crash, and around said top that becomes surrounded by the part 31 during said second stage);

a transverse support 32 interconnecting the free longitudinal end of the collar-forming part 31; and transversely on either side of the support 32, and in a longitudinal segment of each branch of the part 31, an element 18 for fastening to the structure 5.

In FIG. 8, four elements 18 hold the front of the member. 25, two on each of its transverse sides.

Figure 10:
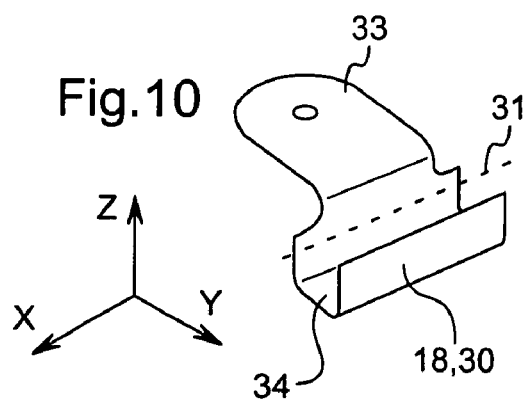
FIG. 10 is a perspective view in longitudinal elevation showing a support for an encircling collar seen from behind, forming a controlled-rupture fastener in an anti-crash system in accordance with the invention, the fastener in this case being made of carbon.

In FIG. 10, one of the elements 18 is in the form of a tab with a lateral tongue 33 from which there extends a trough 34 in which the collar-forming part 31 is received under normal circumstances, i.e. when there is no crash. Each front element 18 thus forms a controlled-rupture fastener 30.

In the normal state of the aircraft 1, the fasteners 30 thus hold the collar part 31 against the structure 5 and above the landing gear leg 9, in this case against the wall 38 at the top of the landing gear well 11.

Since these fasteners 30 provide controlled rupture, they make it possible during the second stage of a crash to release the collar part 31 from the structure 5. For this purpose, the fasteners 30 are made of composite material, for example, and in particular of carbon or the like, so that they break clearly and cleanly.

The fasteners 30 for the front elements 18 serve to hold the member 25 temporarily up to the second stage of a crash.

The purpose is to minimize the space occupied by the anti-crash system 15 during normal operation of the aircraft 1. This also makes it possible to avoid interference between the system 15 and the landing gear 2, still during normal operation.

It should be observed at this point that in the embodiment of FIG. 5, the collar part 31 of the braking member 25 possesses a capture zone (inside the collar part 31) for capturing the landing gear leg 9 at the end of the first stage of a crash.

Since this capture zone is situated at a predetermined and substantially constant distance 35 in elevation above the transverse axis 8 (ignoring orientation), it will be understood that engaging the connection 14 having straps 26 with the collar 31 requires a top end of the leg 9 to rise. The axis 8 is supposed not to move within the structure 5 during a level crash by the system 15.

In this embodiment, during the second stage of a crash, the top end 12 of the landing gear leg 9 comes close to a removable hatch 36 of the top wall 38.

At the end of the first stage of a crash, the removable hatch 36 struck by the top end 12 of the leg 9. As shown in FIG. 8, this removable hatch 36 is surrounded by a zone 37 of controlled weakness.

For example, this zone 37 possesses rivets and/or adhesive of strength that is predetermined to ensure that the hatch 36 separates from the remainder of the floor 10 (i.e. the wall 38) when it is struck by the end 12.

After the removable hatch 36 has been moved out of the way, this allows said end 12 of the leg 9 to pass through the wall 38 and the collar part 31. This results in the leg 9 engaging with the connection 14 having straps 26.

Depending on the embodiment, the top wall 38 is a bottom portion of the structural floor 10, the top of the landing gear well 11, or the like.

There follows a description of examples of the method in accordance with the invention.

In one implementation, during the second stage of a crash, following the first stage, the method provides at least the following additional steps or functions:

functionally separating the landing gear leg 9 from the retraction actuator 6;

retaining and blocking the retraction actuator 6; and once the actuator 6 is blocked, controlled braking of the pivoting of the landing gear leg 9 about its transverse axis 8.

In all implementations, the step of braking the pivoting is provided at least in part by a stage of irreversibly lengthening a deformable connection 14 between the take-up structure 5 and the landing gear leg 9, e.g. at substantially constant force.

For a connection 14 comprising straps 26 and a collar 31, the lengthening stage is performed at least in part by at least one partial destruction action that enables the deformable connection 14 to extend in controlled manner. This connection 14 is direct between the take-up structure 5 and the landing gear leg 9.

For a connection 14 comprising one or more parts 19, the elongation stage is performed at least in part by a plastic deformation action enabling the deformable connection 14 to deploy in controlled manner. This connection 14 between the take-up structure 5 and the landing gear leg 9 is indirect, and includes a relay function performed by the actuator 6 between the structure 5 and the leg 9.

With straps 26, the elongation stage is performed by an extension stage in which the arrangements 27 are destroyed. This destruction is partial, with the connection 14 continuing to connect the leg 9 to the structure 5 for braking purposes.

Nevertheless, the connection 14 between the structure 5 and the leg 9 is not permanent since it is obtained by forcing interposition of the member 25 of said connection 14 prior to the second stage of a crash.

FIGS. 14 to 16 show how the interposition of said connection 14 prior to the second stage of a crash is performed by the engagement that takes place during the first stage between the sliding tube 12 of the leg 9 (then forming the top end of the leg) and a collar 31.

When the connection 14 includes at least one horseshoe-shaped part 19, the lengthening stage is performed at least in part by a stage of deploying said connection 14. In this configuration, the connection 14 between the structure 5 and the leg 9 is permanent in the sense that the leg 9 is structurally connected to the structure 5 via the actuator 6 both in normal operation and during the first or second stages of a crash.

Nevertheless, as explained above, during the second stage of a crash, the blocked actuator 6 is connected to the leg 9 only by the connection 14.

Figure 13:
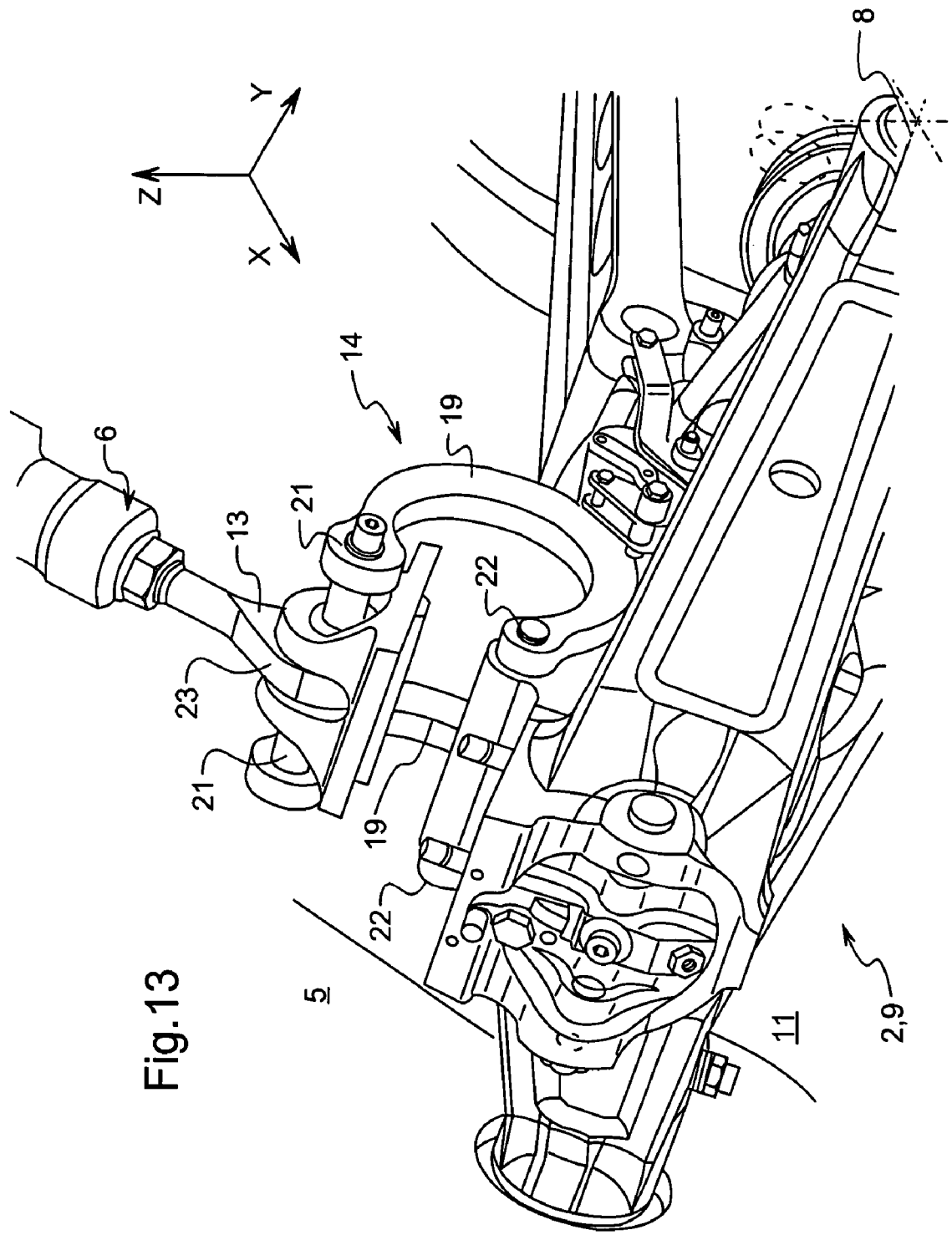
FIG. 13 is a perspective view in longitudinal elevation as seen from in front showing an undercarriage and an anti-crash system in accordance with the invention in which the connection member with controlled lengthening comprises two plastically-deformable horseshoe-shaped parts.

In the example of FIGS. 11 to 13, this connection 14 acts during the second stage of a crash to tilt the part(s) 19 interposed between the landing gear leg 9 and the retraction actuator 6, with the actuator 6 remaining hinged to the leg 9.

In several implementations, provision is made for the leg 9 to pivot freely through an angle E before it starts being braked. Under such circumstances, the free pivot angle E has a predetermined amplitude lying in the range 1° to 30°.

In FIG. 12, this free pivot angle E prior to braking performed by the horseshoe-shaped part 19 is about 22° compared with a total angular amplitude of movement for the leg 9 of about 90°. In FIG. 5, this free pivot angle E prior to braking by the member 25 having straps 26 is of the order of 9°. However in other embodiments the free pivot angle E of the leg 9 may be of the order of no more than a few degrees, and/or it may be adjustable.

From FIGS. 16, 4, and 14, it can be seen that the step of braking movement of the leg 9 about the transverse axis 8 is ensured in certain embodiments by the leg 9 coming into contact with a stop 39. The stop 39 acts by absorbing energy of the crash during the second stage of a crash.

Typically, at the end of the braked stroke of the leg 9, the stop 39 has been subjected to plastic deformation by coming into contact with the leg 9. In the examples shown, it is the sliding tube 12 at the top end of the leg 9 that deforms the stop 39. In this configuration the stop 39 constitutes a front wall 39 of the well 11 for receiving the landing gear 2 at the end of the second stage of a crash.

Earlier, during the first stage of a crash, this top end 12 in the form of a tube slides substantially upwards. Because of this sliding, the top end 12 of the leg 9 strikes a hatch 36 surrounded by a release zone 37 in a top wall 38 of a well 11 for receiving the landing gear 2.

When struck in this way, the top end 12 separates this zone 37 from the remainder of the top wall 38, but without that absorbing any significant amount of energy. As a result the hatch 36 cannot be considered as forming part of the anti-crash means.

Furthermore, it can clearly be seen in FIG. 15 that the functional separation of the leg 9 from the retraction actuator 6 is constituted literally by separation. In this configuration, a shear bolt is sheared during shortening of the leg 9 in the first stage of a crash. This releases a mechanism for retaining the actuator 6 in its functional position. As a result, the connection end 23 of the actuator 6 is physically detached from the leg 9.

In contrast, in FIGS. 12 and 13, it can be seen that the functional separation of the landing gear leg 9 relative to the retraction actuator 6 is performed by tilting without there being any genuine physical separation. In this configuration, the connection 14 is permanent and indirect.

In order to cause the part(s) 19 to tilt, a shear bolt is sheared by the leg 9 shortening. This releases a mechanism for retaining the actuator 6 in its functional position and the connection end 23 of (the actuator 6 is released relative to the leg 9. Unlike the interception versions, the stationary hinge 22 allows the connection 14 to tilt without the leg 9 being completely separated physically from the actuator 6.

It should be observed that this tilting continues until a position in which the connection end 23 and the stationary end 22 of the actuator 6 are in alignment with a zone 24 where the permanent connection 19 is attached to the leg 9.

In numerous implementations, the steps of retaining the actuator 6 in its out-of-the-way position and of applying controlled braking to the landing gear leg 9 are performed simultaneously, at least in part, or even conjointly and in parallel. In general, it should be observed that the retention step occurs as soon as the actuator 6 becomes functionally separated, whether or not braking has started.

Specific embodiments of the anti-crash system 15 for an undercarriage 2 on board an aircraft 1 are described below.

The system 15 comprises at least:
first anti-crash means arranged to damp the shortening of the undercarriage 2 during a first stage of a crash; and
second anti-crash means 16 arranged to inhibit retraction and also to brake pivoting of the leg 9 during a second stage of a crash.

In the embodiments shown, the system 15 of the invention comprises at least:
means for functionally separating the landing gear leg 9 from the actuator 6 at the end of the first stage of a crash;
within the second anti-crash means 16, devices for retaining and blocking the actuator 6; and
within the second anti-crash means 16, a device 19, 25 for applying controlled braking to the pivoting of the landing gear leg 9, said device being distinct from the retraction actuator 6.

Naturally, the system 15 is suitable for implementing the method described above.

As in FIG. 15, the means for functionally separating the leg 9 are separation means that are distinct from the connection 14, 25.

Although not shown, in this example the functional separation means comprise in particular:
a shear bolt for shearing; and
a retention mechanism for retaining the actuator in its functional position.

In the embodiment of FIG. 12 or FIG. 13, the means for functionally separating the leg 9 comprise not only the above-mentioned bolt and retention mechanism, but also the tilt member(s) 19 of the permanent connection 14.

Activating these functional separation means leads to the end 23 of the actuator 6 being released relative to the leg 9. The "stationary" hinge 22 then allows the permanent connection 14 to tilt until it reaches the above-described alignment position.

This alignment substantially along the longitudinal direction X should be compared with the distance D visible in FIG. 11.

From FIG. 11, it can be seen that in the normal operating position of the undercarriage 2, such a distance D exists substantially in elevation along the Z axis between the moving hinge 21 and the "stationary" hinge 22.

As can be seen in FIG. 12, at the end of the first stage of a crash, once the actuator 6 is functionally separated, this distance is considerably reduced or eliminated, because the connection 14 having the horseshoe-shaped part 19 has tilted and moved into alignment.

As mentioned above, the retention device is arranged so that the actuator 6 is maintained substantially in a position where it is out of the way of the leg 9. This retention device is secured to the take-up structure 5.

In certain embodiments, the retention device is secured directly to the take-up structure 5.

Thus, in FIG. 17, the retention device comprises a single strand 41 rigidly secured at one end to a wall 38 of the structure, e.g. a floor 10, while its other end is rigidly secured to the actuator 6.

In FIG. 18, the retention device likewise comprises a single strand, however both of its ends are rigidly secured to the structure 5 so as to form a catenary type cradle in which the actuator 6 rests.

In other embodiments, the retention device is indirectly secured to the take-up structure 5, via a braking device 25.

Thus, in FIG. 19, one of the ends of the strand 41 is rigidly secured to the braking device 25, while its other end is rigidly secured to the actuator 6.

However, in FIG. 20, both ends of the strand 41 are rigidly secured to the braking device 25, with the strand 41 forming a catenary type cradle in which the actuator 6 rests.

In certain examples, such a strand 41 is integrated in a braking device 25 using straps 26.

There follows a description of the device for blocking the actuator 6.

In one embodiment, the blocking device forms part of the first anti-crash means. Typically the device is integrated in the actuator 6. To cause the device to be triggered when needed, the blocking device is often connected to at least one detector of speed and/or of system integrity and/or of the forces applied to the landing gear 2.

When such sensors reach a predetermined measurement value, the blocking device causes the retraction actuator 6 to be blocked in the position or state in which it is to be found at that time.

The braking device is described below.

In the embodiments shown, regardless of whether the braking device comprises a member 19 or a member 25, it is secured firstly to the take-up structure 5 and secondly to the leg 9 of the landing gear, e.g. to an attachment zone 24 or to a sliding tube 12.

The connection to the structure 15 can be direct or indirect.

As described above, in certain embodiments, the braking device and the retention device are formed in part by the same components. A configuration in which the braking and retention devices are the same device, constituted by straps, has even been mentioned, but not shown.

One possibility offered by the invention provides for the braking and retention devices, or more generally the second anti-crash means 16 as a whole, to be free from any pneumatic, hydraulic, or electrical components for control and/or servo-control purposes.

It can be seen from FIGS. 2 to 20 that the examples shown of braking and retention devices are entirely mechanical.

In most embodiments, at least one of the braking device and retention device extends substantially along the longitudinal direction X, at least during certain steps or stages in the operation of the system 15.

For example, in the out-of-the-way position as shown in FIG. 14, the braking device 25 having straps 26 extends substantially in the longitudinal direction X.

Likewise, the braking device having a member 19 finds itself, in its end-of-stroke position, extending substantially along the longitudinal direction X, with the member 19 then also serving to retain the actuator 6.

In all of the embodiments shown, the braking performed by the second anti-crash means 16 leads to irreversible deformation by controlled elongation at substantially constant force.

In FIGS. 2 to 10 and 14 to 20, the connection members 14, 25 are of the type that lengthen by partial destruction. This lengthening allows the deformable connection 14 to extend in controlled manner, and to do so directly between the take-up structure 5 and the landing gear leg 9 in these examples.

Such a deformable connection 14 between the structure 5 and the leg 9 is not permanent, since it is effective only when the end tube 12 is interposed.

By being interposed in this way by the first anti-crash means, the tube 12 serves to engage the leg 9 with a collar 31 or the like of the braking device using straps 26.

In contrast, in FIGS. 11 to 13, each member 19 of a connection 14 is of the type that lengthens by controlled plastic deformation. This irreversible deformation enables the connection 14 to deploy in controlled manner.

This connection is indirect between the take-up structure 5 and the landing gear leg 9, and it includes a component, namely the actuator 6, for relaying crash forces from the leg 9 to the structure 5.

The deformable connection 14 in FIGS. 11 to 13 is between the structure 5 and the leg 6 is permanent. It will be understood that the tilting of the horseshoe-shaped member(s) 19 between the landing gear leg 9 and the retraction actuator 6 does not lead to mechanical discontinuity. The actuator 6 that relays the forces remains constantly hinged to the leg 9 even in the event of a crash.

It is recalled that the specific anti-crash means 16 include means for allowing the leg 9 to move freely relative to the structure 5. This movement E is generally free through an angle of limited amplitude at the beginning of the second stage prior to braking, e.g. about 1° to 30°.

It is also recalled that the stop formed by the front wall 39 serves to absorb energy of the crash during the second stage of a crash.

In FIG. 13, the connection 14 does not have one but rather two parts 19, both being horseshoe-shaped.

Each part 19 is adapted to deform by being straightened out irreversibly. The horseshoe-shaped parts 19 are disposed symmetrically on either side of a midplane X, Z in longitudinal elevation.

Such an arrangement makes it easier to design the parts 19 and to limit parasitic movements of the landing gear leg 9 about its longitudinal direction, i.e. to limit twisting.

In comparison, the single horseshoe-shaped part 19 shown in FIG. 11 is disposed substantially in the midplane X, Z in longitudinal elevation.

Each part 19, whether single or one of two, comprises both a moving hinge 21 connected to a connection end 23 of the actuator 6, and a hinge 22 that is connected to the leg 9 via an attachment zone 24.

All of the hinges 21, 22 of the horseshoe-shaped parts 19 extend substantially in the transverse direction Y.

In embodiments that are not shown, the connection 14 includes at least one part in the form of a tube that is suitable for deforming by shortening irreversibly.

In FIG. 6, it can be seen that each strap 26 is coiled in at least one series of loops, which loops are held coiled by destroyable retaining arrangements 27.

Depending on the embodiment, these arrangements 27 can comprise stitching and/or adhesive and/or heat-sealing. When they are destroyed, they allow the strap 26 of the connection 14 to deploy in controlled and progressive manner.

In an embodiment not shown, the set of straps 26 is arranged close to a bottom portion of the actuator 6 and thus forms a U-shape, with its free limbs pointing upwards (i.e. it is not upside-down).

In greater detail, such a member 25 comprises three straps 26 forming a U-shaped cradle and comprising:

a transverse central bottom strap 26; and two side straps 26.

The central strap 26 of the U-shaped cradle is disposed under the actuator 6, and the side straps 26 extend on either side of the actuator 6. The U-shaped cradle is thus disposed with its free limbs pointing upwards.

The straps 26 are looped through slots 28, each having one longitudinal end engaging the rear hinge fitting 17 connected to the structure 5 and its other end connected via temporary holding elements 18 at the front to the member 25 against the floor 10.

In FIG. 6, the connection elements 18 provide controlled rupture for holding a front collar 31 around the landing gear leg 9 temporarily until the second stage of a crash.

It can be seen from the figures that the system 15 is fitted to a straight undercarriage 2 that is retractable about the transverse axis 8.

It is also clear that the system 15 is fitted to an aircraft 1 that is a rotary wing aircraft in FIG. 1.

In FIGS. 5 and 12, the take-up structure 5 of the aircraft 1 has a wall 38 with a hatch 3.6 for releasing, that is surrounded by a zone of weakness 37.

As shown in FIGS. 3 and 16, the aircraft 1 possesses a take-up structure 5 having a stop 39 for absorbing the energy of a crash at the end of the second stage of a crash, in this case constituted by a front wall 39 of the well 11 for the landing gear 2.

Finally, it should be observed that the invention applies to a variety of types of aircraft 1 and not only to rotary wing aircraft. Thus, the invention can be applied to airplanes, to balloons, or to other flying vehicles.

What is claimed is:

1. An on-board anti-crash method for an undercarriage (2) of an aircraft (1), said undercarriage (2) being of the retractable type, and comprises:
    a landing gear leg (9) hinged to a force take-up structure of the aircraft (1) about a transverse pivot axis (8) in order to enable it to be extended and retracted;
    a retraction actuator (6) having a coupling end hinged to the take-up structure in order to cause the landing gear leg (9) to be extended and retracted;
    first anti-crash means for acting during a first stage of a crash to damp shortening of the undercarriage (2); and
    second anti-crash means (16) for acting during a second stage of a crash to inhibit retraction and to brake pivoting of the leg (9);
    wherein, during a second stage of a crash, after the end of the first stage, the method comprises:
    functionally separating the landing gear leg (9) relative to the retraction actuator (6);
    retaining and blocking the retraction actuator (6); and
    once the actuator (6) has been blocked, providing controlled braking of the pivoting of the landing gear leg (9) about its transverse pivot axis (8),
    wherein the step of braking pivoting is performed at least in part by a stage of irreversibly lengthening of a deformable connection (14, 19, 25) between the take-up structure (5) and the landing gear leg (9) at a constant force,
    the lengthening stage is performed at least in part by a stage of extending by partial destruction a nonpermanent connection (14, 25, 27) between the take-up structure (5) and the leg (9), wherein said connection (14) being obtained by causing a member (25, 31) of said connection (14) to become engaged prior to the second stage of a crash, and
    said connection (14) is caused to become engaged prior to the second stage of a crash by a sliding tube (12) of the landing gear leg (9) being caused to engage with a collar (31) or the like.

2. The method according to claim 1, wherein the lengthening stage is performed at least in part by at least one partial destruction action (27) enabling the deformable connection (14, 25) to extend in controlled manner, wherein said connection (14) between the take-up structure (5) and the landing gear leg (9) is direct.

3. The method according to claim 1, wherein the lengthening stage is performed at least in part by at least one plastic deformation action enabling the deformable connection (14, 19) to be deployed in controlled manner, wherein said connection (14) between the take-up structure (5) and the landing gear leg (9) is indirect, and including a force-relay function (6) between the structure (5) and the leg (9)

4. The method according to claim 1, wherein the lengthening stage is performed at least in part by a stage of deploying a permanent connection (14, 19) between the structure (5) and the leg (9), wherein said connection (14) actuates tilting between the landing gear leg (9) and the retraction actuator (6), said actuator (6) remaining hinged to the leg (9) during the second stage of a crash.

5. The method according to claim 1, wherein the steps of retaining the actuator (6) in an out-of-the-way position and of applying controlled braking to the landing gear leg (9) are performed simultaneously, at least in part, or indeed together in parallel.

6. The method according to claim 1, wherein the functional separation of the landing gear leg (9) relative to the retraction actuator (6) is performed by separation proper by means of a shear bolt which, once sheared by the leg (9) shortening, releases a mechanism for retaining the actuator (6) in its functional position so that a connection end (23) of the actuator (6) is detached from the leg (9).

7. The method according to claim 1, wherein the functional separation of the landing gear leg (9) relative to the retraction actuator (6) is performed by tilting the connection (14, 19) which is permanent and indirect, a shear bolt, which, once sheared by the leg (9) shortening, releases a mechanism for retaining the actuator (6) in its functional position so that a connection end (23) of the actuator (6) is released relative to the leg (9), while a stationary hinge (22) enables the connection (14, 19) to tilt to a position in which the connection end (23) and the stationary end (22) of the actuator (6) are in alignment with an attachment zone (24) where the permanent connection (19) is attached to the leg (9).

8. The method according to claim 1, wherein the leg (9) is allowed to pivot freely prior to braking through a predetermined amplitude (E) lying in the range 1° to 30°, when the total amplitude of pivoting movement of the leg (9) is about 90°.

9. A method according to claim 8, wherein the range is about 9° to about 22°.

10. A method according to claim 8, wherein the range is about 9°.

11. A method according to claim 8, wherein the range is about 22°.

12. An on-board anti-crash method for an undercarriage (2) of an aircraft (1), said undercarriage (2) being of the retractable type, and comprises:
    a landing gear leg (9) hinged to a force take-up structure of the aircraft (1) about a transverse pivot axis (8) in order to enable it to be extended and retracted;
    a retraction actuator (6) having a coupling end hinged to the take-up structure in order to cause the landing gear leg (9) to be extended and retracted;
    first anti-crash means for acting during a first stage of a crash to damp shortening of the undercarriage (2); and
    second anti-crash means (16) for acting during a second stage of a crash to inhibit retraction and to brake pivoting of the leg (9);
    wherein, during a second stage of a crash, after the end of the first stage, the method comprises:
    functionally separating the landing gear leg (9) relative to the retraction actuator (6);
    retaining and blocking the retraction actuator (6); and
    once the actuator (6) has been blocked, providing controlled braking of the pivoting of the landing gear leg (9) about its transverse pivot axis (8),
    wherein the step of braking the leg (9) about the transverse axis (8) is provided in part by putting the leg (9) into contact with a stop (39) for absorbing energy of the crash during the second stage of a crash, followed by the stop being deformed plastically by the leg (9), by means of a sliding top end tube (12) of the landing gear leg (9)

deforming a stop that comprises a front wall (39) of a well (11) for receiving the landing gear (2) at the end of the second stage of a crash.

13. An onboard anti-crash method for an undercarriage (2) of an aircraft (1), said undercarriage (2) being of the retractable type, and comprises:

a landing gear leg (9) hinged to a force take-up structure of the aircraft (1) about a transverse pivot axis (8) in order to enable it to be extended and retracted;

a retraction actuator (6) having a coupling end hinged to the take-up structure in order to cause the landing gear leg (9) to be extended and retracted;

first anti-crash means for acting during a first stage of a crash to damp shortening of the undercarriage (2); and second anti-crash means (16) for acting during a second stage of a crash to inhibit retraction and to brake pivoting of the leg (9)

wherein, during a second stage of a crash, after the end of the first stage, the method comprises:

functionally separating the landing gear leg (9) relative to the retraction actuator (6)

retaining and blocking the retraction actuator (6); and once the actuator (6) has been blocked, providing controlled braking of the pivoting of the landing gear leg (9) about its transverse pivot axis (8), wherein, during the first stage of a crash, a top portion (12) of the landing gear leg (9) slides substantially upwards and strikes a releasable zone (37) in a top wall (38) of a well (11) for receiving the landing gear (2), and separates said zone (37) from the top wall (38), without significant absorption of energy.

* * * * *